United States Patent
Madigan et al.

(10) Patent No.: US 8,897,809 B2
(45) Date of Patent: Nov. 25, 2014

(54) METHOD AND SYSTEM TO AUTOMATICALLY IDENTIFY UNKNOWN IDENTITIES

(75) Inventors: Terry Madigan, Dublin (IE); Lorenzo Fiorillo, San Nicola la Strada (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 373 days.

(21) Appl. No.: 13/511,397

(22) PCT Filed: Nov. 24, 2009

(86) PCT No.: PCT/EP2009/065782
§ 371 (c)(1),
(2), (4) Date: May 23, 2012

(87) PCT Pub. No.: WO2011/063831
PCT Pub. Date: Jun. 3, 2011

(65) Prior Publication Data
US 2012/0231819 A1    Sep. 13, 2012

(51) Int. Cl.
*H04W 24/00*    (2009.01)
*H04L 29/06*    (2006.01)
*H04M 3/42*    (2006.01)
*H04W 12/02*    (2009.01)
*H04W 4/02*    (2009.01)
*H04M 3/22*    (2006.01)
*H04W 64/00*    (2009.01)

(52) U.S. Cl.
CPC .............. *H04L 63/102* (2013.01); *H04W 4/025* (2013.01); *H04M 3/2218* (2013.01); *H04W 4/028* (2013.01); *H04L 63/30* (2013.01); *H04M 3/2281* (2013.01); *H04M 3/42348* (2013.01); *H04W 12/02* (2013.01); *H04W 64/00* (2013.01)
USPC ...................... 455/456.3; 455/414.1; 455/415; 455/435.1; 455/456.1; 455/456.2; 455/456.5; 455/456.6; 379/142.01

(58) Field of Classification Search
CPC .......... H04M 3/2281; H04M 3/42348; H04M 3/2218; H04W 64/00; H04W 4/04; H04W 4/025; H04W 4/028; H04W 4/02; H04W 4/00; H04W 12/02

USPC ............. 455/414.1, 415, 435.1, 456.1–456.6; 379/142.01
See application file for complete search history.

(56) References Cited

U.S. PATENT DOCUMENTS

| | | | | |
|---|---|---|---|---|
| 5,519,760 | A  * | 5/1996 | Borkowski et al. | ........ 455/404.2 |
| 6,185,426 | B1 * | 2/2001 | Alperovich et al. | ........ 455/456.1 |
| 2008/0020742 | A1* | 1/2008 | Vander Veen et al. | ........ 455/415 |

FOREIGN PATENT DOCUMENTS

| | | |
|---|---|---|
| WO | 2006/011165 A1 | 2/2006 |
| WO | 2006/011166 A1 | 2/2006 |
| WO | 2007/073252 A1 | 6/2007 |

OTHER PUBLICATIONS

3GPP, 3rd Generation Partnership Project; Technical Specification Group Services and System Aspects; Functional stage 2 description of Location Services (LCS)(Release 7), 3GPP TS 23.271 V7.8.0, Mar. 2007, 140 pages.

Notificaton of Tansmittal of the International Preliminary Report on Patentabilty issued on May 25, 2012 in corresponding International Application No. PCT/EP2009/065782, 16 pages.

* cited by examiner

*Primary Examiner* — Olumide T Ajibade Akonai
(74) *Attorney, Agent, or Firm* — Rothwell, Figg, Ernst & Manbeck, P.C.

(57) ABSTRACT

The present invention relates to methods, nodes, arrangements and articles of manufacture to automatically identify unknown identities of a target. The method comprises the following steps: positioning indicators indicating presence of a known identity of the target in at least one location are periodically collected; —at least one mobile network is interrogated and lists of identities of users located in defined target areas, each area covering at least one of the collected positioning indicators, are fetched; —a crosscheck between the fetched lists is performed; a single or restricted number of identities that is common to the fetched lists is identified.

15 Claims, 4 Drawing Sheets

METHOD AND SYSTEM TO AUTOMATICALLY IDENTIFY UNKNOWN IDENTITIES

CROSS REFERENCE TO RELATED APPLICATION(S)

This application is a 35 U.S.C. §371 National Phase Entry Application from PCT/EP2009/065782, filed Nov. 24, 2009, designating the United States, the disclosure of which is incorporated by reference herein in its entirety.

TECHNICAL FIELD

The present invention relates to methods, nodes, arrangements and articles of manufacture for automatically identify unknown identities of a target.

BACKGROUND

Lawful Interception of communications can be made based on knowledge of the identity of a party responsible for transmitting or receiving the communication. For example if a mobile telephone number of a criminal suspect is known, it is possible to intercept or retain electronic communication sent from or received by the criminal suspect's mobile telephone. In governments around the world, various law enforcement agencies may have the right to authorize this interception in their respective jurisdictions.

FIG. 1 is part of the prior art and discloses an Intercept Mediation and Delivery Unit IMDU, also called Intercept Unit. The IMDU is a solution for monitoring of Interception Related Information IRI and Content of Communication CC for the same target. The different parts used for interception are disclosed in current Lawful Interception standards (see 3GPP TS 33.108 and 3GPP TS 33.107—Release 7). A Law Enforcement Monitoring Facility LEMF is connected to three Mediation Functions MF, MF2 and MF3 respectively for ADMF, DF2, DF3 i.e. an Administration Function ADMF and two Delivery Functions DF2 and DF3. The Administration Function and the Delivery Functions are each one connected to the LEMF via standardized handover interfaces HI1-HI3, and connected via interfaces X1-X3 to an Intercepting Control Element ICE in a telecommunication system. Together with the delivery functions, the ADMF is used to hide from ICEs that there might be multiple activations by different Law Enforcement Agencies. Messages REQ sent from LEMF to ADMF via HI1 and from the ADMF to the network via the X1_1 interface comprise identities of a target that is to be monitored. The Delivery Function DF2 receives Intercept Related Information IRI from the network via the X2 interface. DF2 is used to distribute the IRI to relevant Law Enforcement Agencies LEAs via the HI2 interface. The Delivery Function DF3 receives Content of Communication CC, i.e. speech and data, on X3 from the ICE. Requests are also sent from the ADMF to the Mediation Function MF2 in the DF2 on an interface X1_2 and to the Mediation Function MF3 in the DF3 on an interface X1_3. The requests sent on X1_3 are used for activation of Content of Communication, and to specify detailed handling options for intercepted CC. In Circuit Switching, DF3 is responsible for call control signaling and bearer transport for an intercepted product. Intercept Related Information IRI, received by DF2 is triggered by Events that in Circuit Switching domain are either call related or non-call related. In Packet Switching domain the events are session related or session unrelated. Lawful Interception needs specific target information to be activated on a suspect.

Law Enforcement Authorities receive the mandate to intercept a certain person usually from a judge. Their first task is to discover the target identities that they can use to activate LI. If the user has a subscription with a telecom operator it is rather straightforward to ask the operator for this information and then activate the interception on the discovered identities. In most cases criminals carry a personal phone which is registered to them and is used solely for legally uncompromising communications, e.g. with family members. The smarter criminals will never compromise themselves on these registered known phones due to their knowledge of Lawful Interception of communications. What they usually do is to get one or more additional secret "identities" by for example using SIMs registered to someone else or buying a prepaid SIM card with a small initial amount which has only to be registered at the first refill. With no known link to the criminal's name or knowledge of these unknown identities, the authorities are powerless to intercept the illegal conversations.

The problem at hand is thus how to discover efficiently additional target identities of a well known person having a known identity and who is a subject of lawful interception due to a judicial warrant.

SUMMARY

The present invention relates to a problem how to automatically identify unknown identities associated to a known identity of a target that is subject of lawful monitoring due to a judicial warrant, which unknown target identities are necessary to perform Lawful Interception. This problem and others are solved by the invention by mechanisms that make use of geographical positioning features and that make a crosscheck between positioning indicators until a single or a restricted number of target identities in a mobile network are identified.

More in detail, by tracing a number of locations where the known identity of the target has been present and collecting from a mobile network all mobile subscribers known to the network to be present in target areas covering these locations, a single or restricted number of subscriber identities can be identified as the only ones present in all areas at collection time. The method comprises the following steps:

positioning indicators indicating presence of a known identity of the target in at least one location are periodically collected;

at least one mobile network is interrogated and lists of identities of users located in defined target areas, each area covering at least one of the collected positioning indicators, are fetched;

a crosscheck between the fetched lists is performed; and a single or restricted number of identities that is common to the fetched lists is identified.

In one aspect of the invention a Lawful Interception embodiment is disclosed. Real time data is collected from positioning indicators and lists of identities are fetched from mobile networks.

An object of the invention is to enhance the Lawful Interception solution in order to ensure automatic discovering of unknown target identities associated to a well known target identity that is subject of lawful monitoring due to a judicial warrant.

Other than with the above-mentioned method, this object and other are achieved by a node to automatically identify unknown identities of a target associated to a known identity thereof, where the node comprises:

means for periodically collecting positioning indicators indicating presence of a known identity of the target in at least one location, means for sending a request to monitor users present in a target area covering a collected positioning indicator, and means for receiving a list of user identities.

Furthermore, the above object and others are achieved by an arrangement to automatically identify unknown identities of a target associated to a known identity thereof, where the arrangement comprises:

means for periodically collecting positioning indicators indicating presence of a known identity of the target in at least one location, means for interrogating at least one mobile network to fetch lists of identities of users located in at least one target area covering at least one collected positioning indicator, means for crosschecking between the fetched lists, and means for identifying a single or restricted number of identities that is common to the fetched lists.

The means adopted in the nodes and arrangements of the present invention can be circuits, processors, electronic components, parts or subparts, chips, boards, computer readable program codes, computers, or combinations or groups thereof, and the like.

The above object and others are also achieved by an article of manufacture comprising a program storage memory having computer readable program code embodied therein to automatically identify unknown identities of a target associated to a known identity thereof, the program code comprising:

computer readable program code able to collect positioning indicators indicating presence of a known identity of the target in at least one location, computer readable program code able to interrogate at least one mobile network to fetch lists of identities of users located in at least one target area covering at least one collected positioning indicator, computer readable program code able to crosscheck between the fetched lists, and computer readable program code able to identify a single or restricted number of identities that is common to the fetched lists.

An advantage with the invention is that an agency will be able to identify for example additional phone numbers or mobile identities of a suspect in an automatic way when a specific mobile phone number or identity of the individual is known. In these way commonly used techniques, such as using for example anonymous prepaid subscriptions to elude monitoring can be neutralized.

The invention will now be described more in detail with the aid of preferred embodiments in connection with the enclosed drawings.

DETAILED DESCRIPTION

Figure 1:
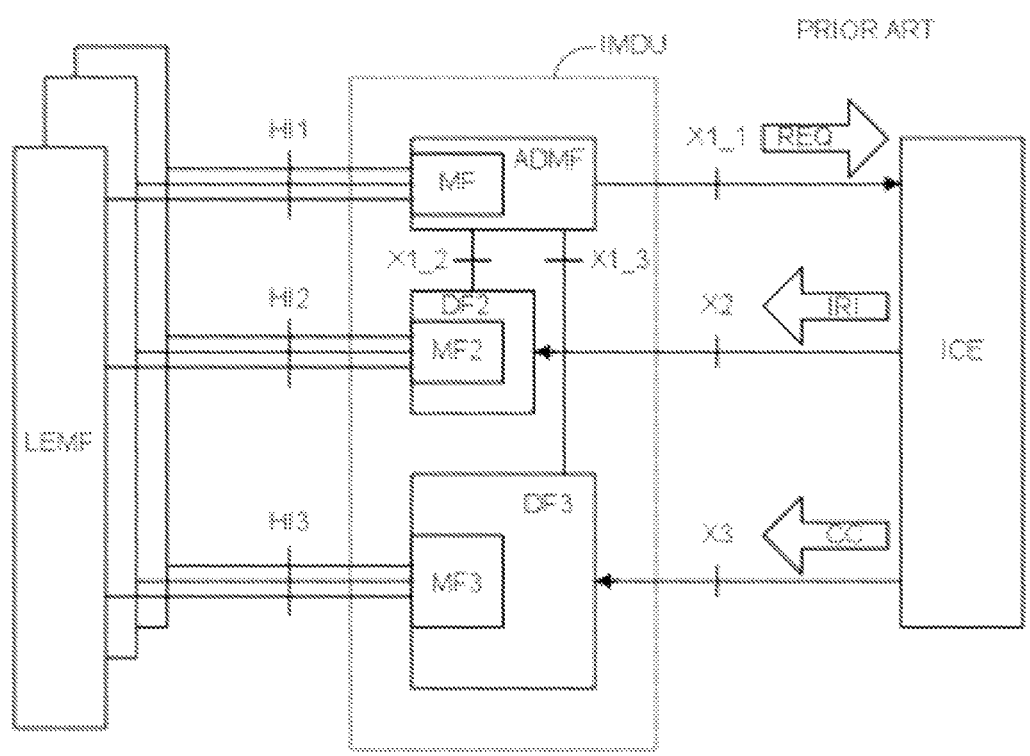
FIG. 1 is part of the prior art and discloses a block schematic illustration of an Intercept Mediation and Delivery Unit attached to an Intercepting Control Element.
Figure 2:
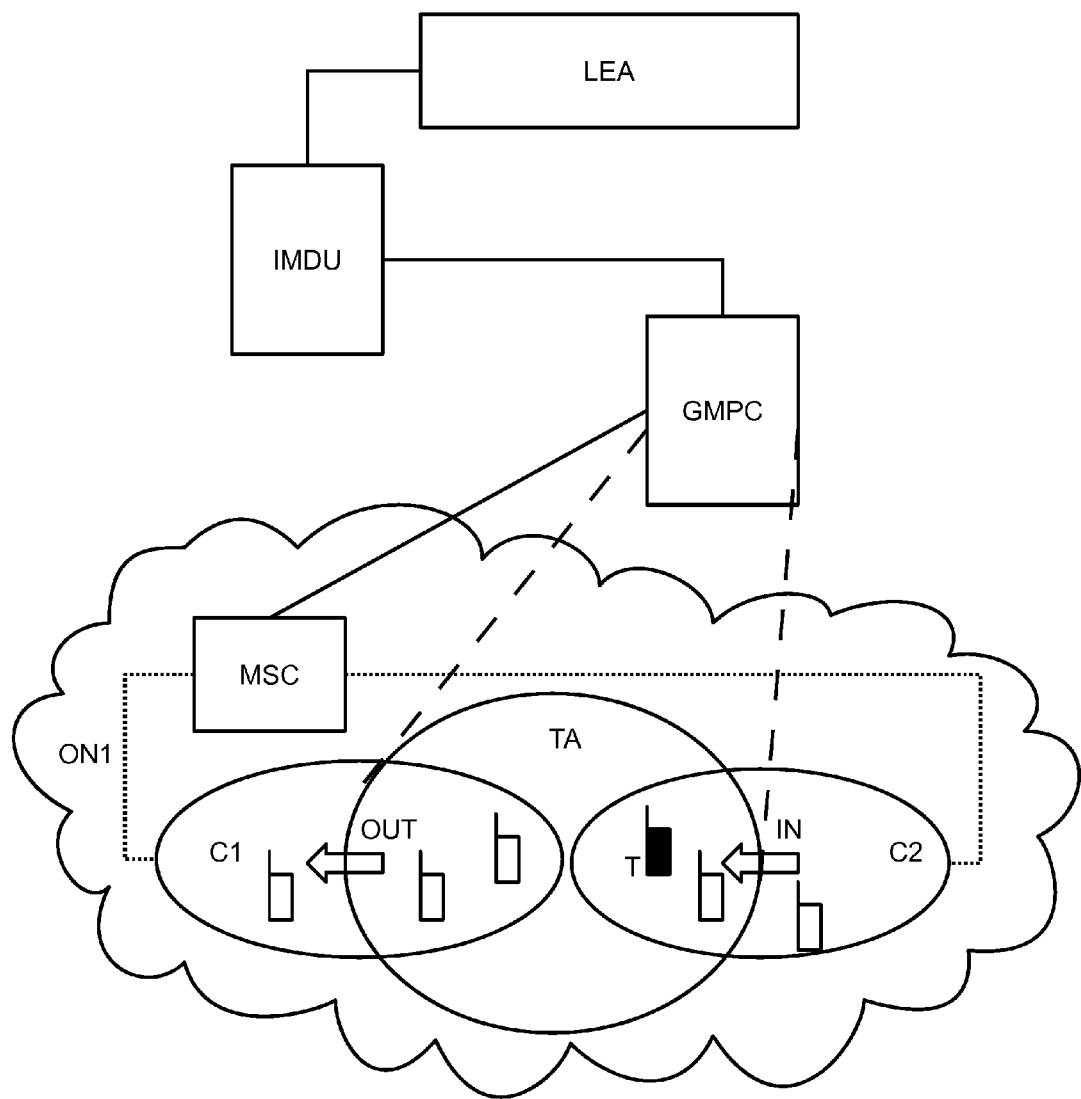
FIG. 2 is a block schematic illustration disclosing a target area within a operator network and the arrangement of units up to the Law Enforcement Agency LEA.

FIG. 2 discloses a telecommunication system. The system comprises in this example one Operator Network ON1. A target known identity T, i.e. a mobile phone identifier of subject under interception, can be seen in FIG. 2. The identity can be for example one of MSISDN, IMEI and IMSI codes commonly associated to a mobile phone subscription. The target is present in a target area TA in this example, having entered it at a certain moment (arrow IN) and going to exit it at a certain subsequent moment (arrow OUT). The Operator Network ON1 comprises two cell areas C1 and C2. A Mobile Switching Centre MSC controls the cell areas C1 and C2. In the example of the figure the target area TA partially overlaps the two cell areas C1 and C2, and can be defined as a "shape" (a circle, an oval, a polygon, etc.) but it can also be defined to coincide with one cell, for example C1 or C2, or with a group of cells, for example the group resulting from the combination of cell C1 and cell C2. A Lawful Interception unit IMDU (Intercept Mediation and Delivery Unit) is disclosed in FIG. 2. This IMDU has similar functionalities as the IMDU discussed in the BACKGROUND ART section of this application, and is operatively connected to a Law Enforcement Agency LEA for reporting information about the subject under interception. This IMDU is sometimes also referred to as LI-IMS (Lawful Intercept Mediation System).

Between the IMDU and the MSC is interposed a Gateway Mobile Positioning Centre (GMPC) which is part of a mobile positioning system which provides location based services. More specifically, the GMPC can perform several functions related to the geographical location of cell phones. Of particular interest for the present invention is the functionality "Any phone within an area" through which the GMPC can interrogate the Operator Network ON1 and retrieve a snapshot of all the subscribers within a given area, for example the target area TA of FIG. 2. The general configuration and operation of a GMPC within a mobile positioning system is generally known and will not be described further in detail unless it is necessary for the proper understanding of the present invention.

Figure 3:
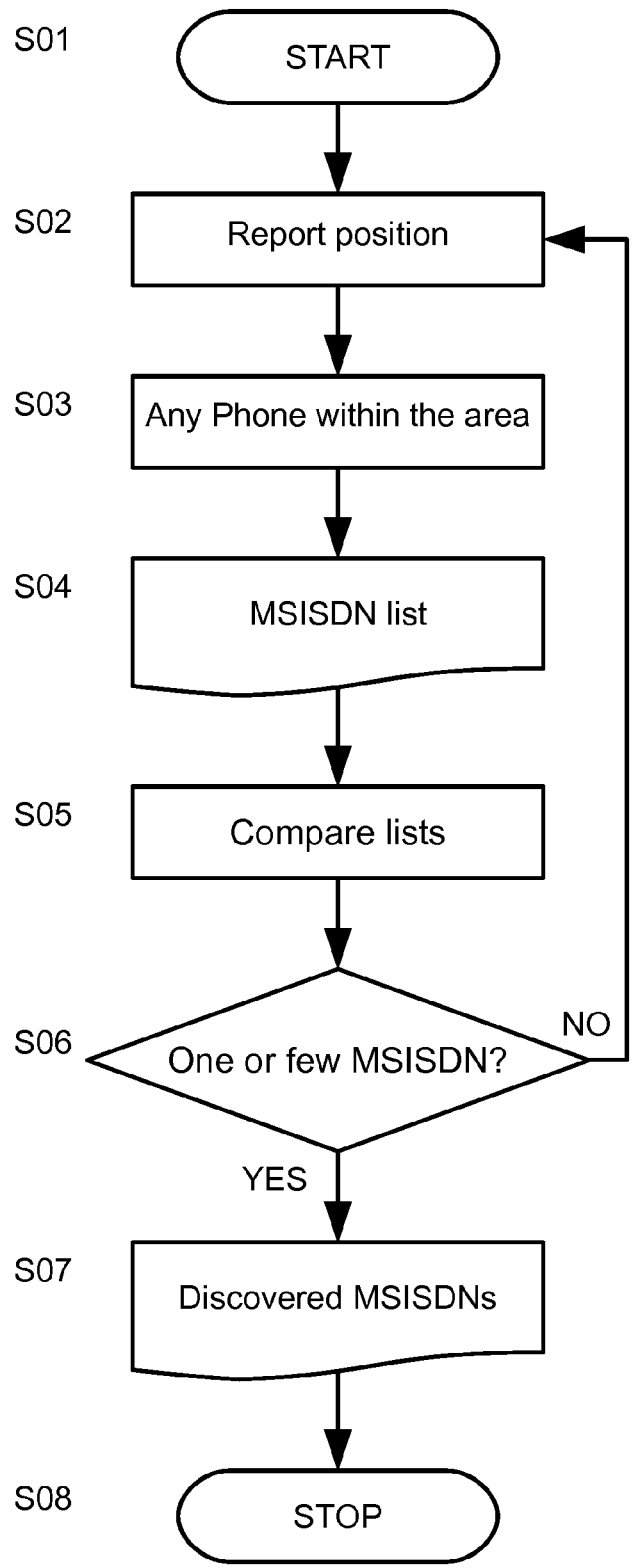
FIG. 3 is a block diagram showing the steps taken to automatically discover unknown identities through the Spatial Trigger Functionality "Any phone within the area".

For a better understanding of the invention, a typical although non-limiting scenario is now described by way of example, with reference to FIG. 3. The target is under interception via his known identity, e.g. MSISDN. The process of automatically identifying his other unknown identity or identities starts at 501. The position of the target, i.e. the location of his known identity, regardless his telephone activity, is periodically reported in step S02. At each positioning report received, the functionality "Any phone within the area" (S03) is activated to retrieve a list, e.g. a MSISDN list S04, of all identities within the target area defined the position of the known identity.

It is to be noted that the specific target area can be selected amongst a group of areas (which are predetermined areas corresponding to a shape, a cell or group of cells) as the geographical area comprising the geographical location of the know identity of the target, or it can be identified as the area where the known identity enters, as it is indicated by arrow IN in FIG. 2. In other words, triggering criteria such as "Any phone entering an area" can be used as an alternative or in combination with the report of the geographical coordinates of the known identity to identify the target area subjected to scrutiny with the "Any phone within the area" functionality.

Over a period of time, more spatial surveys are done based on the position of the target. The process is iterative and every time a new MSISDN list is retrieved, it is compared with the previous one, or with the results deriving from previous comparisons of MSISDN lists (S05). In particular, the lists are crosschecked until a single or a very restricted number of MSISDNs is identified (S06). The criteria for ending the iteration can be based on e.g. the identification of a small number of MSISDN, possibly but not limitatively less than two or three unknown identities to be associated to the known identity, or the iteration can be stopped after the same number of identities repeatedly occurs, for a certain number of times, when comparing the lists, or a combination of these criteria, or analogous ones.

A report of the discovered identities, e.g. MSISDN, is delivered in S07 after which the process stops (S08).

Figure 4:
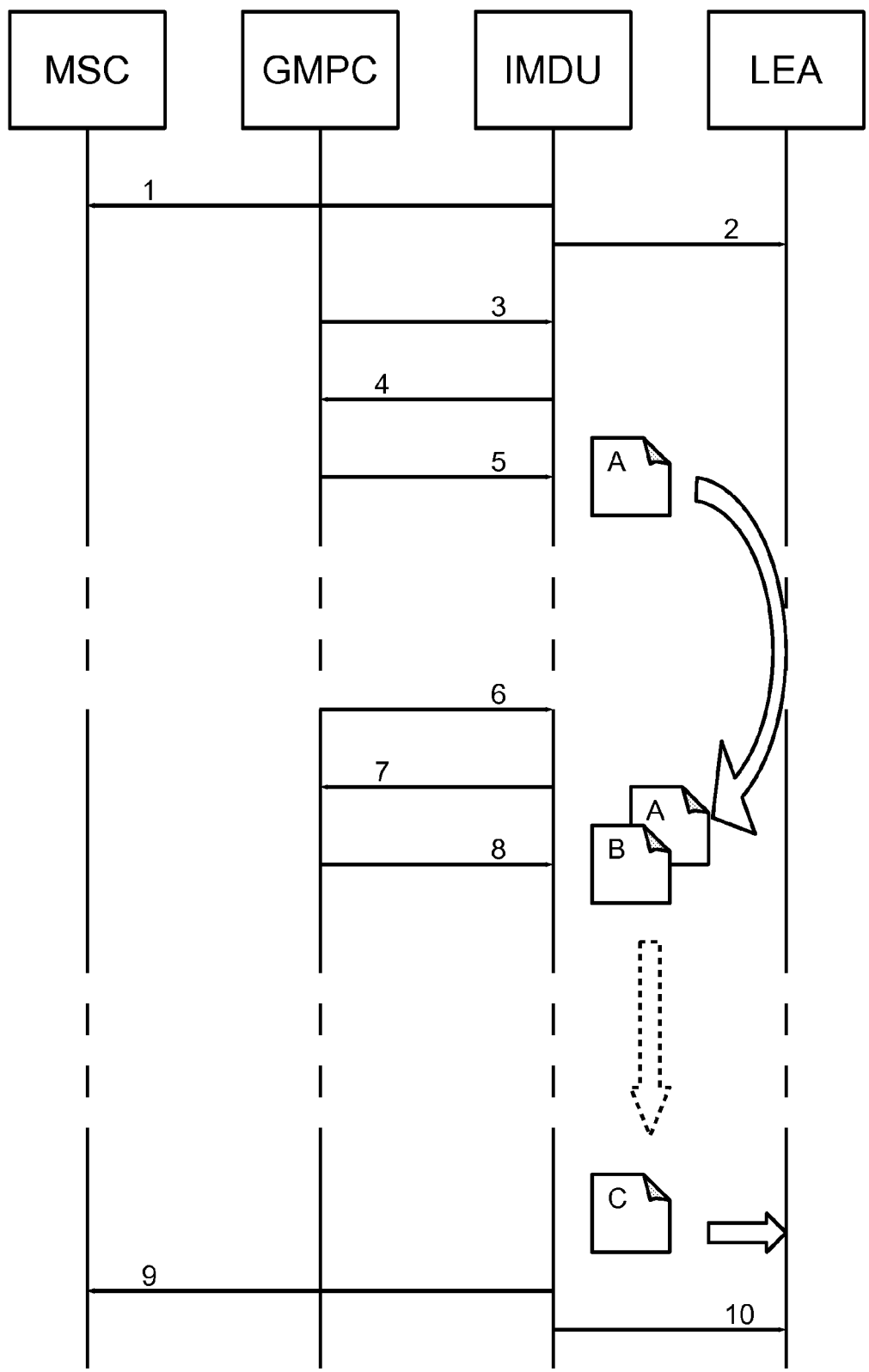
FIG. 4 discloses a signal sequence diagram representing collecting and handling of various data in a Lawful interception environment.

A method according to the preferred embodiment of the invention will now be explained together with FIG. 4. Signalling points MSC, GMPC, IMDU and LEA have all been shown and briefly explained earlier in FIG. 2. The method according to the preferred embodiment comprises the following steps:

The IMDU sends out 1 signals to activate the monitoring of the known identity of the target.

The IMDU sends out 2 signals to LEA through the Handover Interface to inform that the monitoring of the known identity has been activated.

The target T is in a location and brings the registered/known phone/subscription with him, together with any associated unregistered/unknown phone(s)/subscription(s).

The GMPC sends out 3 periodical positioning reports to the IMDU.

At the first periodical positioning report received by GMPC, the IMDU determines the area where the subscriber is and invokes 4 an "Any phone within the area" request towards the GMPC.

The GMPC sends out 5 a first e.g. MSISDN list which is received by the IMDU and stored as data set baseline A.

The target T moves around bringing the known subscription with him, together with any associated unknown subscription(s).

As the target moves around, the GMPC sends out 6 other periodical positioning reports to the IMDU, and the system continues to invoke other "Any phone within the area" requests 7. For each new data set B which the GMPC sends out 8 to the IMDU, the system removes those MSISDNs which do not appear in each subsequent set of MSISDNs.

Users located within the target area and reported to the IMDU are those users who are present in the area substantially at the same time when a position of the target is reported within that area.

Eventually, after this iterative process there will be a single or a restricted number of MSISDNs left. At this point, the IMDU stops 9 invoking GMPC and produces an IRI REPORT 10 towards the LEA including all the unveiled target identity(s) C.

As an option, a warrant could be automatically created by IMDU on this newly discovered target identity(s) to facilitate the monitoring.

As it has been mentioned above, the present invention makes use of spatial triggers. A spatial trigger is a feature that allows a Location Services (LCS) client to define spatial criteria. The GMPC monitors the criteria and when it is fulfilled the GMPC reports to the LCS client.

Within the context of the present invention, the following spatial triggers are used:
"Any phone within an area", and
"All phones entering an area".

The use of spatial triggers is related to the concept of target area, which can be a cell-id (i.e. CGI/SAI), a cell-id list or a shape (defined for example as a circle or a polygon or the like).

A system that can be used to put the invention into practice is schematically shown in the FIGS. 1-4. Enumerated items are shown in the figure as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The systems and methods of the present invention may be implemented for example on any of the Third Generation Partnership Project (3GPP), European Telecommunications Standards Institute (ETSI), American National Standards Institute (ANSI) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multifunction hardware. Processing functions may be implemented using a programmed microprocessor or general-purpose computer. The invention is not limited to the above described and in the drawings shown embodiments but can be modified within the scope of the enclosed claims.

The invention claimed is:

1. A method by a node to automatically identify unknown identities of a target associated to a known identity, comprising the following steps:
periodically collecting positioning indicators indicating presence of a known identity of the target in at least one location;
interrogating at least one mobile network to fetch lists of identities of users located in at least one target area covering at least one collected positioning indicator;
crosschecking between the fetched lists; and
identifying a single or restricted number of identities that is common to the fetched lists, said single or restricted number of identities being unknown identities of a target associated to said known identity.

2. The method according to claim 1, wherein at least one mobile network is operatively connected to a mobile positioning centre, and further comprising the following steps: sending from the mobile positioning centre one positioning indicator of the at least one location of the known identity of the target; determining a target area where the known identity is present; and sending to the mobile positioning centre a request to retrieve from the at least one mobile network a list of users located within the target area.

3. The method according to claim 2, wherein users located within the target area are present in the area at collecting time of the at least one positioning indicator covered by the corresponding at least one target area.

4. The method according to claim 1, further comprising the step of establishing that the single or restricted number of identities corresponds to the known identity.

5. The method according to claim 1, wherein the at least one target area is selected from the group comprising a geometric area, a cell and a group of cells.

6. The method according to claim 1, wherein a plurality of target areas is predetermined, and wherein the positioning indicators indicate that the known target enters one of the target areas.

7. A node to automatically identify unknown identities of a target associated to a known identity, wherein the node is configured to: periodically collect positioning indicators indicating presence of a known identity of the target in at least one location; send a request to monitor users present in a target area covering a collected positioning indicator; receive a list of user identities; crosscheck between received lists; and identify a single or restricted number of identities that is common to the received lists, said single or restricted number of identities being unknown identities of a target associated to said known identity.

8. A node to automatically identify unknown identities of a target associated to a known identity, the node comprising: one or more circuits for periodically collecting positioning indicators indicating presence of a known identity of the target in at least one location; one or more circuits for sending a request to monitor users present in a target area covering a collected positioning indicator; one or more circuits for receiving a list of user identities; one or more circuits for crosschecking between received lists; and one or more circuits to identify a single or restricted number of identities that is common to the received lists, said single or restricted number of identities being unknown identities of a target associated to said known identity.

9. An arrangement to automatically identify unknown identities of a target associated to a known identity, the arrangement comprising one or more circuits configured to: periodically collect positioning indicators indicating presence of a known identity of the target in at least one location; interrogate at least one mobile network to fetch lists of identities of users located in at least one target area covering at least one collected positioning indicator; crosscheck between the fetched lists; and identify a single or restricted number of identities that is common to the fetched lists, said single or restricted number of identities being unknown identities of a target associated to said known identity.

10. An arrangement to automatically identify unknown identities of a target according to claim 9, wherein said arrangement is part of a lawful interception configuration.

11. An arrangement to automatically identify unknown identities of a target according to claim 9, wherein at least one mobile network is operatively connected to a mobile positioning centre, and wherein said one or more circuits are further configured to: send from the mobile positioning centre at least one positioning indicator of the location of the known identity of the target; determine a target area where the known identity is present; and receive to the mobile positioning centre a request to retrieve from the at least one mobile network a list of users located within the target area.

12. An arrangement to automatically identify unknown identities of a target according to claim 9, wherein said one or more circuits are further configured to deliver positioning indicators indicating that the known target enters one of a number of predetermined target areas.

13. An arrangement to automatically identify unknown identities of a target according to claim 9, wherein said one or more circuits are further configured to select a target area from the group comprising a geometric area, a cell and a group of cells.

14. An arrangement to automatically identify unknown identities of a target associated to a known identity, the arrangement comprising at least one processor, wherein: the at least one processor periodically collects positioning indicators indicating presence of a known identity of the target in at least one location; the at least one processor interrogates at least one mobile network to fetch lists of identities of users located in at least one target area covering at least one collected positioning indicator; the at least one processor crosschecks between the fetched lists; and the at least one processor identifies a single or restricted number of identities that is common to the fetched lists, said single or restricted number of identities being unknown identities of a target associated to said known identity.

15. An article of manufacture comprising a program storage memory having computer readable program code embodied therein to automatically identify unknown identities of a target associated to a known identity, the program code comprising: computer readable program code able to collect positioning indicators indicating presence of a known identity of the target in at least one location; computer readable program code able to interrogate at least one mobile network to fetch lists of identities of users located in at least one target area covering at least one collected positioning indicator; computer readable program code able to crosscheck between the fetched lists; and computer readable program code able to identify a single or restricted number of identities that is common to the fetched lists, said single or restricted number of identities being unknown identities of a target associated to said known identity.

* * * * *

UNITED STATES PATENT AND TRADEMARK OFFICE
CERTIFICATE OF CORRECTION

| | | |
|---|---|---|
| PATENT NO. | : 8,897,809 B2 | Page 1 of 1 |
| APPLICATION NO. | : 13/511397 | |
| DATED | : November 25, 2014 | |
| INVENTOR(S) | : Madigan et al. | |

It is certified that error appears in the above-identified patent and that said Letters Patent is hereby corrected as shown below:

In the Specification

In Column 1, Line 30, delete "is part" and insert -- is a part --, therefor.

In Column 3, Line 56, delete "is part" and insert -- is a part --, therefor.

Signed and Sealed this
Twenty-first Day of July, 2015

Michelle K. Lee
*Director of the United States Patent and Trademark Office*